(12) United States Patent
Kunkle et al.

(10) Patent No.: US 7,730,711 B2
(45) Date of Patent: Jun. 8, 2010

(54) METHODS AND APPARATUS FOR A COMBUSTION TURBINE NITROGEN PURGE SYSTEM

(75) Inventors: Kevin Lee Kunkle, Simpsonville, SC (US); Steven William Backman, Simpsonville, SC (US); David William Smith, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1248 days.

(21) Appl. No.: 11/268,041

(22) Filed: Nov. 7, 2005

(65) Prior Publication Data

US 2007/0101723 A1    May 10, 2007

(51) Int. Cl.
*F02G 3/00* (2006.01)
(52) U.S. Cl. .................................................. 60/39.094
(58) Field of Classification Search .............. 60/39.094, 60/739, 734, 646
See application file for complete search history.

(56) References Cited

U.S. PATENT DOCUMENTS

| | | | |
|---|---|---|---|
| 3,895,094 A | 7/1975 | Carter et al. | |
| 4,284,015 A | 8/1981 | Dickinson | |
| 4,490,105 A | 12/1984 | Hunsberger et al. | |
| 4,980,040 A | 12/1990 | Lichtin et al. | |
| 5,398,497 A | 3/1995 | Suppes | |
| 5,609,041 A | 3/1997 | Rathbone et al. | |
| 5,680,764 A | 10/1997 | Viteri | |
| 6,145,294 A | 11/2000 | Traver et al. | |
| 6,438,963 B1 | 8/2002 | Traver et al. | |
| 6,449,955 B2* | 9/2002 | Tanaka et al. | 60/776 |
| 6,543,428 B1 | 4/2003 | Blandino et al. | |
| 6,729,135 B1 | 5/2004 | Norris et al. | |
| 6,898,935 B2 | 5/2005 | Barber et al. | |
| 7,014,930 B2 | 3/2006 | Daniel et al. | |
| 7,021,048 B2 | 4/2006 | Taylor, III et al. | |
| 7,296,412 B2* | 11/2007 | Hall et al. | 60/772 |
| 2004/0172951 A1* | 9/2004 | Hannemann et al. | 60/776 |

\* cited by examiner

*Primary Examiner*—Michael Cuff
*Assistant Examiner*—Andrew Nguyen
(74) *Attorney, Agent, or Firm*—Armstrong Teasdale LLP (57) ABSTRACT

A method of operating a fuel system is provided. The method includes removing fuel from at least a portion of the fuel system using a gravity drain process. The method also includes channeling nitrogen into at least a portion of the fuel system to facilitate removing air and residual fuel from at least a portion of the fuel system, thereby mitigating a formation of carbonaceous precipitate particulates. The method further includes removing air and nitrogen from at least a portion of the fuel system during a fuel refilling process using a venting process, such that at least a portion of the fuel system is substantially refilled with fuel and substantially evacuated of air and nitrogen. The method also includes removing air from at least a portion of the refilled fuel system using a venting process.

14 Claims, 2 Drawing Sheets

METHODS AND APPARATUS FOR A COMBUSTION TURBINE NITROGEN PURGE SYSTEM

BACKGROUND OF THE INVENTION

This invention relates generally to rotary machines and, more particularly, to nitrogen purge sub-systems.

In some known dual-fuel combustion turbines, the turbine is powered by burning either a gaseous fuel or a liquid fuel, the latter fuel typically being distillate oil. These combustion turbines have fuel supply systems for both liquid and gas fuels. Combustion turbines generally do not burn both gas and liquid fuels at the same time. Rather, when the combustion turbine burns liquid fuel, the gas fuel supply is removed from service. Alternatively, when the combustion turbine burns gaseous fuel, the liquid fuel supply is removed from service.

In some known industrial combustion turbines, a combustion system may have an array of combustion cans, each of which has at least one liquid fuel nozzle and at least one gas fuel nozzle. In the combustion can arrangement, combustion is initiated within the combustion cans at a point slightly downstream of the nozzles. Air from the compressor (normally used to deliver compressed air to the combustion system) flows around and through the combustion cans to provide oxygen for combustion.

Some known existing combustion turbines that have dual fuel capacity (gas fuel as primary and liquid fuel as backup) may be susceptible to carbon deposits, in the form of carbonaceous precipitate particulates, forming in the liquid fuel system. Carbonaceous particulate precipitation and subsequent deposition generally begins when liquid fuel is heated to a temperature of 177° C. (350° F.) in the absence of oxygen. In the presence of oxygen, the process accelerates and carbonaceous particulate precipitation begins at approximately 93° C. (200° F.). As carbonaceous particulates accumulate, they effectively reduce the cross-sectional passages through which the liquid fuel flows. If the carbonaceous particulate precipitation continues unabated, particulates may obstruct the liquid fuel passages. In general, the warmer areas of a combustion turbine tend to be associated with the combustion system that is located in the turbine compartment of many known combustion turbine systems. Therefore, the formation of carbonaceous particulates will most likely be facilitated when subjected to the turbine compartment's heat and may not be present in the liquid fuel system upstream of the turbine compartment.

Prior to burning gas fuel the liquid fuel nozzle passages are normally purged via a purge air system that is flow connected to the liquid fuel system. However, static liquid fuel may remain in a portion of the system positioned in the turbine compartment to facilitate readiness for a rapid fuel transfer. During those periods when the liquid fuel system is removed from service, the purge air sub-system is at a higher pressure at the point of flow communication with the liquid fuel system and air infiltration into a portion of the liquid fuel system is more likely. This condition may increase the potential for interaction between fuel and air and, subsequently, carbonaceous particulate formation may be facilitated.

In general, when liquid fuel systems remain out of service beyond a predetermined time limit, there is an increased likelihood that the static liquid fuel within the turbine compartment will begin to experience carbonaceous particulate precipitation. Purge air infiltration into the liquid fuel system facilitates air contact with liquid fuel and the potential for extended air-to-fuel interaction increases as the length of period of time associated with maintaining the fuel system out of service increases and the magnitude of air infiltration increases. As noted above, liquid fuel carbonaceous particulate precipitation is facilitated at a much lower temperature in the presence of oxygen. Considering that some known turbine compartment temperatures have been measured in excess of 157° C. (315° F.), carbonaceous particulate precipitation is even more likely to occur if infiltrating purge air remains in contact with static liquid fuel. As carbonaceous particulates form, they pose the potential of obstructing liquid fuel internal flow passages, including those in the combustion fuel nozzles.

BRIEF DESCRIPTION OF THE INVENTION

In one aspect, a method of operating a fuel system is provided. The method includes removing fuel from at least a portion of the fuel system using a gravity drain process The method also includes channeling nitrogen into at least a portion of the fuel system to facilitate removing air and residual fuel from at least a portion of the fuel system, thereby mitigating a formation of carbonaceous precipitate particulates. The method further includes removing air and nitrogen from at least a portion of the fuel system during a fuel refilling process using a venting process, such that at least a portion of the fuel system is substantially refilled with fuel and substantially evacuated of air and nitrogen. The method also includes removing air from at least a portion of the refilled fuel system using a venting process.

In another aspect, a nitrogen purge sub-system for a liquid fuel system for a dual fuel combustion turbine is provided. The fuel system has at least one cavity. The nitrogen purge sub-system includes a source of nitrogen coupled to a pipe in flow communication with the cavity. The purge sub-system further includes at least one valve that controls flow of nitrogen from the source to the cavity via the pipe. The at least one valve has an open condition such that nitrogen flows from the source through the pipe and into the cavity to facilitate removal of liquid fuel and air from the cavity such that a formation of a carbonaceous precipitate particulate is mitigated.

In a further aspect, a liquid fuel system including at least one valve, at least one pipe, at least one cavity, and at least one pump is provided. The at least one valve and at least one pipe include a nitrogen purge sub-system. The nitrogen purge sub-system includes a source of nitrogen coupled to a pipe in flow communication with the cavity. The purge sub-system further includes at least one valve that controls flow of nitrogen from the source to the cavity via the pipe. The at least one valve has an open condition such that nitrogen flows from the source through the pipe and into the cavity to facilitate removal of liquid fuel and air from the cavity such that a formation of a carbonaceous precipitate particulate is mitigated.

DETAILED DESCRIPTION OF THE INVENTION

Figure 1:
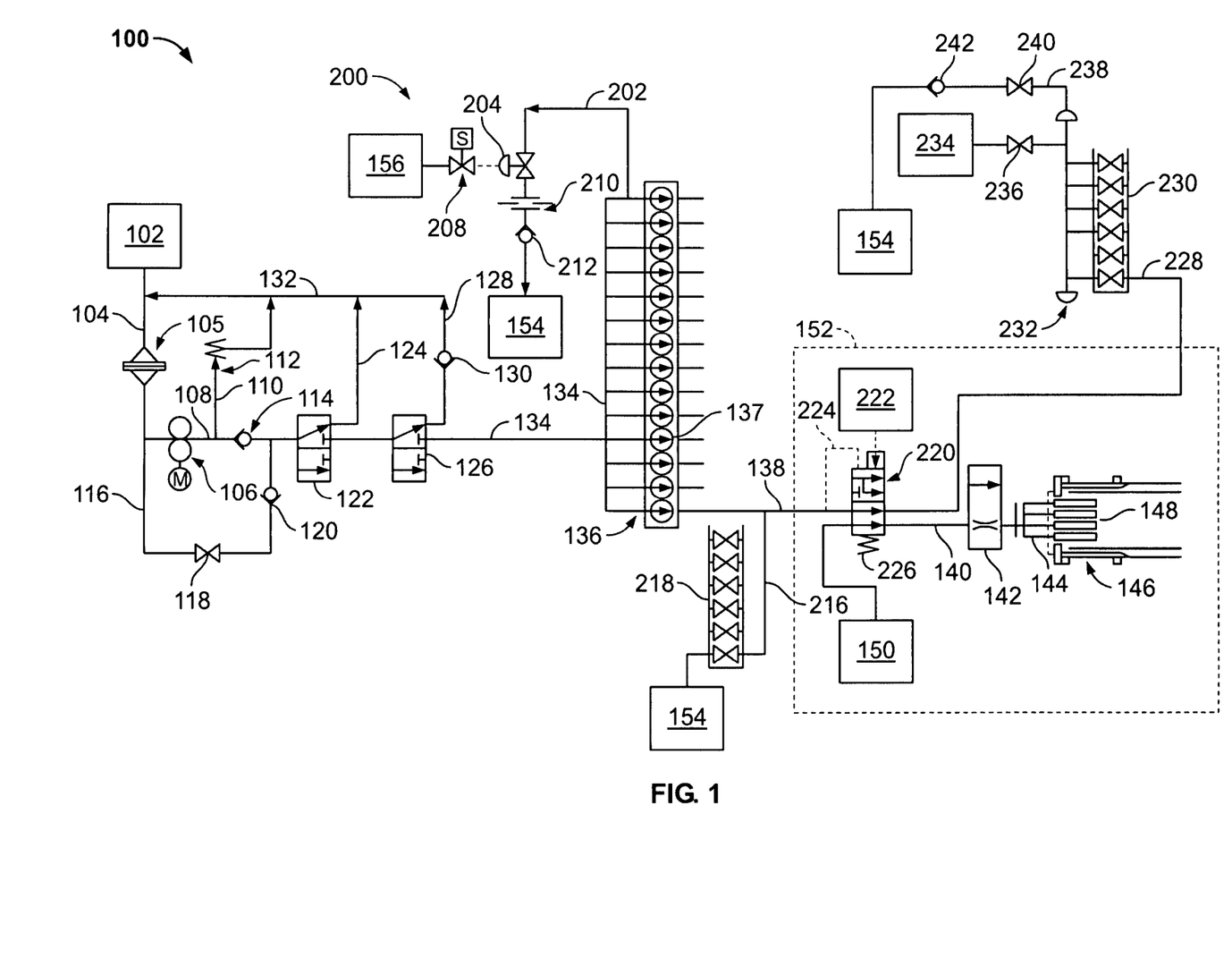
FIG. 1 is a schematic illustration of an exemplary embodiment of a liquid fuel system including a nitrogen purge sub-system.

FIG. 1 is a schematic illustration of an exemplary embodiment of a liquid fuel system 100 having a nitrogen purge sub-system 200. Liquid fuel system 100 has at least one cavity that includes piping, headers, and tanks that further include a liquid fuel forwarding sub-system 102, a fuel pump suction header 104, at least one liquid fuel filter 105, a fuel pump 106, a fuel pump discharge header 108, a fuel pump discharge pressure relief valve header 110, a fuel pump discharge pressure relief valve 112, a fuel pump discharge check valve 114, a fuel pump bypass header 116, a bypass header manual blocking valve 118, a fuel pump bypass header check valve 120, a liquid fuel flow control valve 122, a control valve recirculation header 124, a liquid fuel flow stop valve 126, a stop valve recirculation header 128, a stop valve recirculation line check valve 130, a common recirculation header 132, a flow divider suction header 134, a flow divider 136 including at least one non-driven gear pump 137, at least one flow divider discharge header 138 (only one illustrated for clarity), at least one combustion can supply header 140 (only one illustrated for clarity), at least one combustion can flow venturi 142 (only one illustrated for clarity), at least one combustion can liquid fuel nozzle supply manifold 144 (only one illustrated for clarity), at least one combustion can 146 (only one illustrated for clarity) including a plurality of liquid fuel nozzles 148, and a liquid fuel purge air sub-system 150. Turbine compartment 152 is illustrated with a dotted line. System 100 also includes a false start drain tank 154 and an instrument air sub-system 156.

Nitrogen purge sub-system 200 includes a flow divider suction header pressure relief valve supply header 202, a flow divider suction header pressure relief valve 204, a solenoid valve 208, a flow orifice 210, a check valve 212, at least one liquid fuel drain header 216 (only one illustrated for clarity), at least one liquid fuel manual drain valve 218, at least one three-way valve 220 (only one illustrated for clarity), a pilot air supply 222 (only one illustrated for clarity), at least one three-way valve sensing line 224 (only one illustrated for clarity), at least one three-way valve biasing spring 226 (only one illustrated for clarity), at least one nitrogen purge/air vent header 228 (only one illustrated for clarity), at least one nitrogen purge/air vent header manual blocking valves 230 (only one illustrated for clarity), a common nitrogen purge/air vent collection manifold 232, a nitrogen supply sub-system 234, a nitrogen supply manual blocking valve 236, a vent line 238, a vent line manual blocking valve 240, and a vent line check valve 242.

Liquid fuel flows into liquid fuel system 100 from liquid fuel forwarding sub-system 102. Liquid fuel forwarding sub-system 102 may include at least one storage tank (not shown in FIG. 1) and at least one pump (not shown in FIG. 1). During liquid fuel operation, at least one liquid fuel forwarding pump facilitates liquid fuel flow to suction header 104 and fuel flows through filter 105 to the inlet of fuel pump 106. Fuel pump 106 discharges fuel into discharge header 108, wherein pressure relief valve 112 is positioned and biased to protect pump 106 by facilitating sufficient flow through pump 106 in the event the design flow of pump 106 cannot be achieved, thereby facilitating protection of pump 106, a pump motor (not shown in FIG. 1) and the associated piping downstream of pump 106. Relief valve header 110 is flow connected to common recirculation header 132. Liquid fuel normally flows from discharge header 108 to control valve 122 through check valve 114. Check valve 114 is positioned and biased to facilitate a reduction of reverse liquid fuel flow from discharge header 108 through pump 106 to facilitate a prevention of reverse rotation of pump 106.

Pump bypass header 116 includes manual blocking valve 118 and check valve 120. The purpose of header 116 is to facilitate supplying liquid fuel to system 100 as an alternative to pump 106, for example, filling system 100 with liquid fuel while venting as described in more detail below. Valve 118 is normally closed and may be opened to facilitate flow. Check valve 120 is positioned and biased to facilitate a reduction in fuel flow from pump discharge header 108 back to pump suction line 104 while pump 106 is in service.

Liquid fuel flows through control valve 122 and stop valve 126. FIG. 1 illustrates the disposition of valves 122 and 126 in a mode wherein the combustion turbine (not shown in FIG. 1) is firing on natural gas with liquid fuel system 100 removed from service, i.e. a gas fuel mode of operations. Control valve 122 and stop valve 126 are illustrated as being disposed to facilitate liquid fuel flow through respective recirculation headers 124 and 128 to common recirculation header 132. Header 132 subsequently facilitates flow to pump suction header 104. It is noted that recirculation flow while fuel system 100 is out of service may be small due to pump 106 normally being removed from service during these periods.

When pump 106 is in service and liquid fuel flow into header 108 is induced by pump 106 and the combustion turbine is operating on gas fuel, valves 122 and 126 may be biased to facilitate substantially all of liquid fuel flow from pump 106 to recirculation headers 124 and 128, respectively, i.e., a liquid fuel standby mode of operations. Flow through header 124 may be greater than flow through header 128. Therefore, check valve 130 is positioned in header 128 and is biased to facilitate a reduction in fuel flow from header 132 to stop valve 126 via header 128.

When system 100 is in service and the combustion turbine is operating on liquid fuel, i.e., a liquid fuel mode of operations, pump 106 is normally in service, valves 122 and 126 are biased to facilitate flow to flow divider suction header 134 and liquid fuel is channeled to flow divider 136. Flow divider 136 includes a plurality of non-driven gear pumps 137 that facilitate substantially similar and consistent flow distribution to each associated combustion can 146.

Each gear pump 137 provides sufficient resistance to flow to facilitate a substantially similar fuel pressure throughout header 134, thereby facilitating a substantially similar suction pressure to each gear pump 137. Also, each gear pump 137 is rotatingly powered via liquid fuel flow from header 134 through each associated gear pump 137 and discharges fuel at a pre-determined rate with a pre-determined discharge pressure into each associated flow divider discharge header 138. One of the subsequent flow channels that include one gear pump 137, one header 138 and one three-way valve 220 is discussed below.

Upon discharge from flow divider 136, liquid fuel flows from header 138 to associated three-way valve 220. FIG. 1 illustrates three-way valve 220 disposed to facilitate purge air flow from purge air sub-system 150 to combustion can 146 via valve 220. This disposition may be referred to as the air purge mode of operations for valve 220. The illustrated disposition of valve 220 also demonstrates fuel header 138 in flow communication with nitrogen purge/air vent header 228. During combustion turbine liquid fuel flow mode operations, valve 220 is normally biased to facilitate fuel flow from header 138 to combustion can 146. This disposition of valve 220 may be referred to as the liquid fuel combustion mode of operations for valve 220. In this mode, valve 220 also substantially blocks purge air flow from purge air sub-system 150 and may permit a portion of fuel flow to header 228. Valve 220 includes pilot air supply 222 that receives air from purge air sub-system 150. Valve 220 also includes a shuttle spool (not shown in FIG. 1) and the shuttle spool includes a plurality of flow ports (not shown in FIG. 1) that facilitate the purge air and liquid fuel flows appropriately for the selected mode of combustion turbine operations. Pilot air supply 222 induces a bias on valve 220 shuttle spool that tends to induce movement of the shuttle spool such that liquid fuel is transmitted to combustion can 146. Sensing line 224 induces a bias on valve 220 shuttle spool that tends to induce movement of the shuttle spool such that liquid fuel is transmitted to can 146. Valve 220 further includes spring 226 that induces a bias to position valve 220 shuttle spool to facilitate purge air flow to combustion can 146. Therefore, when system 100 is in service, liquid fuel pressure induced via pump 106 is greater than the substantially static purge air sub-system 150 pressure and spring 226 bias to position the shuttle spool such that liquid fuel flows from header 138 through three-way valve 220 to combustion can supply header 140. Alternatively, pilot air sub-system 222 pressure may be greater than the substantially static purge air system 150 pressure and spring 226 bias to position valve 220 shuttle spool such that liquid fuel flows from header 138 through three-way valve 220 to combustion can supply header 140.

Purge air from purge air sub-system 150 is normally biased to a higher, substantially static pressure than the substantially static liquid fuel system pressure with pump 106 out of service. During gas fuel mode operations with pump 106 not in service, purge air sub-system 150 pressure, in conjunction with spring 226, biases three-way valve 220 associated with each combustion can 146 so that liquid fuel is blocked from entering the respective combustion can 146 and purge air may be transmitted to can 146. Purge air may be used to facilitate removal of liquid fuel from header 140 and manifold 144 via nozzles 148 upon termination of liquid fuel combustion in associated combustion can 146. Purge air may also facilitate nozzle 148 cooling via injection of cool air into nozzles 148 during gas fuel mode of operations. It is this same purge air that is transmitted to can 146 and facilitates actuation of three-way valve 220, that may seep past the seals (not shown in FIG. 1) in three-way valve 220, interact with liquid fuel, and facilitate carbonaceous particulate precipitation.

During transfer of combustion turbine operations from gas fuel mode to liquid fuel mode, pump 106 is placed into service and liquid fuel pressure in header 138 is increased. When liquid fuel pressure in header 138 exceeds purge air pressure, three-way valve 220 spool will start to shuttle and will eventually substantially terminate purge air flow to combustion can 146 and facilitate liquid fuel flow to can 146. In a typical system 100, liquid fuel pressure will begin to bias the spool to shuttle to the position that facilitates fuel flow at approximately 552 kilopascal differential (kPad) (80 pounds per square inch differential (psid)) above purge air pressure.

In the exemplary embodiment of sub-system 200, during combustion turbine gas fuel mode of operation, if three-way valve 220 sustains any potential leaks, purge air will tend to leak into liquid fuel system 100 rather than liquid fuel leaking into header 140 due to the purge air sub-system 150 pressure normally being greater than static header 138 pressure. Therefore, a potential of fuel leakage via valve 220 is decreased, however, a potential for air and fuel interaction is increased. This condition is discussed in more detail below.

As discussed above, as a function of the predetermined mode of combustion turbine operations, either liquid fuel or purge air is transmitted to header 140. Flow from header 140 is subsequently transmitted to fuel nozzles 148 located in combustion can 146 via combustion can air flow venturi/fuel flow header 142 and manifold 144. Air flow venturi 142 may be biased to facilitate minimizing purge air flow into combustion can 146 while purge air is flowing into header 140 via placing a flow restriction, i.e., a venturi, in the flow path. FIG. 1 illustrates air flow venturi/fuel flow header 142 biased to the air venturi disposition. During periods wherein fuel is transmitted to header 140, fuel flow header 142 may be biased to facilitate substantially unrestricted fuel flow to manifold 144. Manifold 144 facilitates equalizing fuel and purge air flow to nozzles 148. Combustion can 146 facilitates fuel combustion and energy release to the combustion turbine.

In the exemplary embodiment, pressure relief valve 204 is positioned in flow communication with header 134 via header 202 at a high point in liquid fuel system 100 such that air removal from at least a portion of system 100 to false start drain tank 154 may be facilitated. In the event that liquid fuel may be entrained with the air being removed, tank 154 is designed to receive liquid fuel. Valve 204 is normally biased in the closed position. Orifice 210 is located downstream of pressure relief valve 204 such that when pump 106 is in service or valve 118 is open, and valves 122 and 126 are disposed to facilitate liquid fuel flow into header 134, open valve 204 will not facilitate an excessive flow of fuel to tank 154. For some predetermined operational modes discussed in further detail below, solenoid valve 208 is actuated to place instrument air sub-system 156 in flow communication with the operating mechanism of valve 204. Instrument air from sub-system 156 biases valve 204 to an open disposition. Check valve 212 is positioned and biased to facilitate minimizing fuel and air flow from tank 154 to header 134.

In an alternative embodiment, an automated timer mechanism (not shown in FIG. 1) may be provided to periodically open valve 204 to remove air from at least a portion of system 100 at predetermined time intervals in the absence of operator action.

FIG. 1 illustrates further embodiments of nitrogen purge sub-system 200. Nitrogen purge/air vent headers 228 are each in flow communication with associated three-way valves 220. Headers 228 each include one associated manual blocking valve 230. Headers 228 and associated valves 230 are in flow communication with common nitrogen purge/air vent collection manifold 232. Nitrogen supply sub-system 234 is in flow communication with manifold 232 via manual blocking valve 236. False start drain tank 154 is in flow communication with manifold 232 via vent header 238, manual block valve 240 and check valve 242. Check valve 242 is positioned and biased such that flow from tank 154 to manifold 232 is substantially minimized.

Each of liquid fuel drain valves 218 are in flow communication with each header 138 via each drain header 216. Each of valves 218 are also in flow communication with tank 154.

During predetermined operational activities, for example, subsequent to a shift from combustion turbine liquid fuel mode to gas fuel mode, liquid fuel manual drain valves 218 may be opened to drain liquid fuel from a portion of system 100 downstream of stop valve 126 via drain headers 216. Upon verification that liquid fuel is sufficiently drained from a portion of system 100, nitrogen supply valve 236 may be opened to nitrogen purge manifold 232. As nitrogen flows into manifold 232 and vent header 238, valve 240 may be opened for a sufficient period of time to remove air from header 238 and manifold 232. When pressure is equalized in manifold 232, nitrogen purge valves 230 may be opened to permit nitrogen to flow into purge headers 228. With valves 220 biased to facilitate purge air flow into headers 140, and fuel headers 138 in flow communication with headers 228, nitrogen may flow through valves 220 into headers 138 via three-way valves 220. Nitrogen pressure tends to bias flow of remaining liquid fuel towards drain headers 216 and out of a portion of system 100 via drain valves 218 to false start drain tank 154. Upon completion of nitrogen purge activities, valves 218 may be closed and nitrogen pressure may be maintained in headers 228 and 138 to facilitate prevention of air infiltration into header 138. In addition, vent valve 204 may be biased towards an open disposition as described above for a predetermined period of time to facilitate air and/or liquid fuel removal from a portion of system 100 between valves 220 and the interconnection point between headers 134 and 202 into tank 154 via a bias induced via nitrogen purge activities.

In the exemplary embodiment, nitrogen purge/air vent headers 228 have a substantially upward slope with respect to flow divider discharge headers 138. The upward slope facilitates transport of purge air that may leak through three-way valves 220 during periods when the combustion turbine is operating in gas fuel mode as described above. Collection manifold 220 is positioned to be the high point of a portion of system 100 to facilitate air flow toward collection manifold 232 from valves 220 via headers 228.

Nitrogen purge sub-system 200 also facilitates refilling headers 138 with liquid fuel up to and past three-way valves 220, i.e., into headers 228, such that the potential for air to remain in headers 138 and valves 220 is substantially minimized. Once liquid fuel forwarding pump (not shown in FIG. 1) of fuel forwarding sub-system 102 is placed in service, valve 118 is opened and valves 122 and 126 are biased to transmit liquid fuel to header 134. Liquid fuel will substantially fill headers 138 via flow divider 136. As liquid fuels enters headers 138, air and nitrogen are biased towards headers 228 and transmitted to false start drain tank 154 via valves 230, manifold 232, header 238, valve 240 and check valve 242. In addition, vent valve 204 may be biased towards an open disposition as described above for a predetermined period of time to facilitate air and/or nitrogen removal from a portion of system 100 between valve 126 and the interconnection point between headers 134 and 202 into tank 154 via a bias induced via liquid fuel filling activities.

Some known combustion turbine maintenance activities include facilitation of air introduction into various system 100 cavities while the combustion turbine is in a shutdown condition, for example, in headers 138 between flow dividers 136 and three-way valves 220. This air may remain in headers 138 through combustion turbine commissioning activities and facilitate formation of air pockets that may facilitate a delay in initiating a substantially steady liquid fuel flow during combustion turbine restart. Sub-system 200 facilitates removal of air from headers 138 using the liquid fuel refilling method of system 100 as described above. This method may increase reliability of operating mode transfers from gas fuel to liquid fuel during commissioning.

Sub-system 200 facilitates a potential increase in combustion turbine reliability by permitting liquid fuel to be maintained up to valves 220 with the potential for air pockets in fuel system 100 mitigated, thereby facilitating gas fuel-to-liquid fuel mode transfers. Liquid fuel maintenance up to valves 220 is facilitated by a method of filling system 100 with liquid fuel while venting air via sub-system 200. Sub-system 200 further facilitates maintenance of liquid fuel up to valves 220 via facilitating a method of purge air removal from liquid fuel via upwardly-sloped headers 228. System 100 reliability may also be increased via mitigation of carbonaceous particulate formation, wherein the formation process is described above.

Sub-system 200 may mitigate carbonaceous particulate formation in fuel system 100 via facilitating a method of removing liquid fuel via a fuel drain process and a nitrogen purge process from areas wherein temperatures may exceed 93° C. (200° F.). The nitrogen purge process also facilitates removal of air from a portion of system 100 that substantially reduces the potential for air and fuel interaction.

Sub-system 200 may also facilitate reliability via providing a method for liquid fuel removal from at least a portion of system 100 using the aforementioned gravity drain and nitrogen purge processes that facilitate biasing liquid fuel towards false start drain tank 154, wherein these processes also facilitate mitigating the potential for liquid fuel to be received, and subsequently ignited, by combustor cans 146 during gas fuel mode operations.

Figure 2:
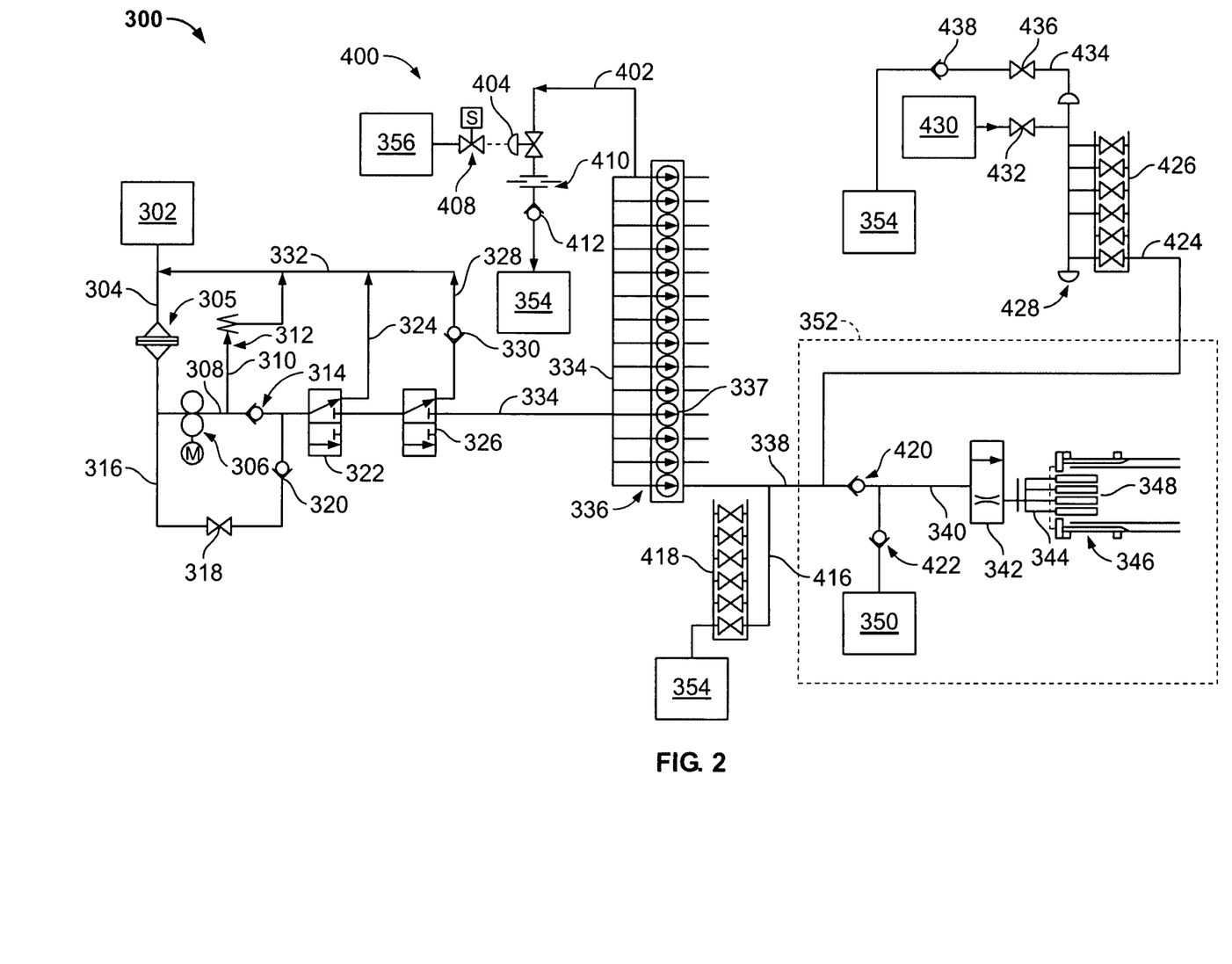
FIG. 2 is a schematic illustration of an alternate embodiment of a liquid fuel system including a nitrogen purge sub-system.

FIG. 2 is a schematic illustration of an alternate embodiment of a liquid fuel system 300 having a nitrogen purge sub-system 400. Liquid fuel system 300 has at least one cavity that includes piping, headers, and tanks that further include a liquid fuel forwarding sub-system 302, a fuel pump suction header 304, at least one liquid fuel filter 305, a fuel pump 306, a fuel pump discharge header 308, a fuel pump discharge pressure relief valve header 310, a fuel pump discharge pressure relief valve 312, a fuel pump discharge check valve 314, a fuel pump bypass header 316, a bypass header manual blocking valve 318, a fuel pump bypass header check valve 320, a liquid fuel flow control valve 322, a control valve recirculation header 324, a liquid fuel flow stop valve 326, a stop valve recirculation header 328, a stop valve recirculation line check valve 330, a common recirculation header 332, a flow divider suction header 334, a flow divider 336 including at least one non-driven gear pump 337, at least one flow divider discharge header 338 (only one illustrated for clarity), at least one combustion can supply header 340 (only one illustrated for clarity), at least one combustion can flow venturi 342 (only one illustrated for clarity), at least one combustion can liquid fuel nozzle supply manifold 344 (only one illustrated for clarity), at least one combustion can 346 (only one illustrated for clarity) including a plurality of liquid fuel nozzles 348, and a liquid fuel purge air sub-system 350. Turbine compartment 352 is illustrated with a dotted line. System 300 also includes a false start drain tank 354 and an instrument air sub-system 356.

Nitrogen purge sub-system 400 includes a flow divider suction header pressure relief valve supply header 402, a flow divider suction header pressure relief valve 404, a solenoid valve 408, a flow orifice 410, a check valve 412, at least one liquid fuel drain header 416 (only one illustrated for clarity), at least one liquid fuel manual drain valve 418, at least one fuel check valve 420 (only one illustrated for clarity), at least one air purge check valve 422 (only one illustrated for clarity), at least one nitrogen purge/air vent header 424 (only one illustrated for clarity), at least one nitrogen purge /air vent header manual blocking valve 426 (only one illustrated for clarity), a common nitrogen purge/air vent collection manifold 428, a nitrogen supply sub-system 430, a nitrogen supply manual blocking valve 432, a vent line 434, a vent line manual blocking valve 436, and a vent line check valve 438.

Liquid fuel flows into liquid fuel system 300 from liquid fuel forwarding sub-system 302. Liquid fuel forwarding sub-system 302 may include at least one storage tank (not shown in FIG. 2) and at least one pump (not shown in FIG. 2). During liquid fuel operation, at least one liquid fuel forwarding pump facilitates liquid fuel flow to suction header 304 and fuel flows through filter 305 to the inlet of the fuel pump 306. Fuel pump 306 discharges fuel into discharge header 308, wherein pressure relief valve 312 is positioned and biased to protect pump 306 by facilitating sufficient flow through pump 306 in the event the design flow of pump 306 cannot be achieved, thereby facilitating protection of pump 306, a pump motor (not shown in FIG. 2) and the associated piping downstream of pump 306. Relief valve header 310 is flow connected to common recirculation header 332. Liquid fuel normally flows from discharge header 308 to control valve 322 through check valve 314. Check valve 314 is positioned and biased to facilitate a reduction of reverse liquid fuel flow from discharge header 308 through pump 306 to facilitate a prevention of reverse rotation of pump 306.

Pump bypass header 316 includes manual blocking valve 318 and check valve 320. The purpose of header 316 is to facilitate supplying liquid fuel to system 300 as an alternative to pump 306, for example, filling system 300 with liquid fuel while venting as described in more detail below. Valve 318 is normally closed and may be opened to facilitate flow. Check valve 320 is positioned and biased to facilitate a reduction in fuel flow from pump discharge header 308 back to pump suction line 304 while pump 306 is in service.

Liquid fuel flows through control valve 322 and stop valve 326. FIG. 2 illustrates the disposition of valves 322 and 326 in a mode wherein the combustion turbine (not shown in FIG. 2) is firing on natural gas with liquid fuel system 300 removed from service, i.e., a gas fuel mode of operations. Control valve 322 and stop valve 326 are illustrated as being disposed to facilitate liquid fuel flow through respective recirculation headers 324 and 328 to common recirculation header 332. Header 332 subsequently facilitates flow to pump suction header 304. It is noted that recirculation flow while fuel system 300 is out of service may be small due to pump 306 normally being removed from service during these periods.

When pump 306 is in service and liquid fuel flow into header 308 is induced by pump 306 and the combustion turbine is operating on gas fuel, valves 322 and 326 may be biased to facilitate substantially all of liquid fuel flow from pump 306 to recirculation headers 324 and 328, respectively, i.e., a liquid fuel standby mode of operation. Flow through header 324 may be greater than flow through header 328. Therefore, check valve 330 is positioned in header 328 and is biased to facilitate a reduction in fuel flow from header 332 to stop valve 326 via header 328.

When system 300 is in service and the combustion turbine is operating on liquid fuel, i.e., a liquid fuel mode of operation, pump 306 is normally in service, valves 322 and 326 are biased to facilitate flow to flow divider suction header 334 and liquid fuel is channeled to flow divider 336. Flow divider 336 includes a plurality of non-driven gear pumps 337 that facilitate substantially similar and consistent flow distribution to each associated combustion can 346.

Each gear pump 337 provides sufficient resistance to flow to facilitate a substantially similar fuel pressure throughout header 334, thereby facilitating a substantially similar suction pressure to each gear pump 337. Also, each gear pump 337 is rotatingly powered via liquid fuel flow from header 334 through each associated gear pump 337 and discharges fuel at a pre-determined rate with a pre-determined discharge pressure into each associated flow divider discharge header 338. One of the subsequent flow channels that include one gear pump 337, one header 338, one fuel check valve 420, and one purge air check valve 422 is discussed below.

Upon discharge from flow divider 336, liquid fuel flows from header 338 to associated fuel check valve 420. When system 300 is in service, liquid fuel pressure induced via pump 306 is greater than the substantially static purge air sub-system 350 pressure. Fuel check valve 420 is positioned and biased to facilitate liquid fuel flow to combustion can supply header 340 and to substantially reduce purge air flow into header 340 when system 300 is in service. Therefore, fuel check valve 420 is biased open and purge air check valve 422 is biased closed.

Purge air check valve 422 is positioned and biased to facilitate purge air flow to combustion can supply header 340 and to substantially reduce liquid fuel flow into header 340 when system 300 is not in service. Purge air from purge air sub-system 350 is normally biased to a higher, substantially static pressure than the substantially static liquid fuel system pressure with pump 306 out of service. During gas fuel mode operations, pump 306 is not in service. Therefore, purge air check valve 422 is biased open and fuel check valve 420 is biased closed and liquid fuel is substantially blocked from entering the respective combustion can 346 and purge air may be transmitted to can 346. Purge air may be used to facilitate removal of liquid fuel from header 340 and manifold 344 via nozzles 348 upon termination of liquid fuel combustion in associated combustion can 346. Purge air may also facilitate nozzle 348 cooling via injection of cool air into nozzles 348 during gas fuel mode of operation. It is this same purge air, that is transmitted to can 346, that may seep past check valve 422, interact with liquid fuel, and facilitate carbonaceous particulate precipitation.

During transfer of combustion turbine operations from gas fuel mode to liquid fuel mode, pump 306 is placed into service and liquid fuel pressure in header 338 is increased. When liquid fuel pressure in header 338 exceeds purge air pressure, bias induced by the fuel pressure on fuel check valve 420 induces check valve 420 to start to open and bias induced by the fuel entering header 340 induces purge air check valve 422 to start to close. As fuel pressure continues to increase above purge air pressure, check valve 422 will tend to substantially close such that purge air flow to combustion can 346 is substantially terminated and check valve 420 will be substantially open to facilitate liquid fuel flow to can 346.

In the alternative embodiment, during combustion turbine gas flow mode operations, if liquid fuel check valves 420 and/or purge air check valves 422 sustain any potential leaks, purge air will tend to leak into liquid fuel system 300 rather than liquid fuel leaking into header 340 due to purge air sub-system 350 pressure normally being greater than static header 338 pressure. Therefore, a potential of fuel leakage via check valve 420 is decreased, however, a potential for air and fuel interaction is increased. This condition is addressed further below.

As discussed above, as a function of the predetermined mode of combustion turbine operations, either liquid fuel or purge air is transmitted to header 340. Flow from header 340 is subsequently transmitted to fuel nozzles 348 located in combustion can 346 via combustion can air flow venturi/fuel flow header 342 and manifold 344. Air flow venturi 342 may be biased to facilitate minimizing purge air flow into combustion can 346 while purge air is flowing into header 340 via placing a flow restriction, i.e., a venturi, in the flow path. FIG. 2 illustrates air flow venturi/fuel flow header 342 biased to the air venturi disposition. During periods wherein fuel is transmitted to header 340, fuel flow header 342 may be biased to facilitate substantially unrestricted fuel flow to manifold 344. Manifold 344 facilitates equalizing fuel and purge air flow to nozzles 348. Combustion can 346 facilitates fuel combustion and energy release to the combustion turbine.

In the alternative embodiment, pressure relief valve 404 is positioned in flow communication with header 334 via header 402 at a high point in liquid fuel system 300 such that air removal from at least a portion of system 300 to false start drain tank 354 may be facilitated. In the event that liquid fuel may be entrained with the air being removed, tank 354 is designed to receive liquid fuel. Valve 404 is normally biased in the closed position. Orifice 410 is located downstream of pressure relief valve 404 such that when pump 306 is in service or valve 318 is open, and valves 322 and 326 are disposed to facilitate liquid fuel flow into header 334, open valve 404 will not facilitate an excessive flow of fuel to tank 354. For some predetermined operational modes, discussed in further detail below, solenoid valve 408 is actuated to place instrument air sub-system 356 in flow communication with the operating mechanism of valve 404. Instrument air from sub-system 356 biases valve 404 to an open disposition. Check valve 412 is positioned and biased to facilitate minimizing fuel and air flow from tank 354 to header 334.

In another alternative embodiment, an automated timer mechanism (not shown in FIG. 2) may be provided to periodically open valve 404 to remove air from at least a portion of system 300 at predetermined time intervals in the absence of operator action.

FIG. 2 illustrates further embodiments of nitrogen purge sub-system 400. Nitrogen purge/air vent headers 424 are each in flow communication with associated headers 338. Headers 424 each include one associated manual blocking valve 426. Headers 424 and associated valves 426 are in flow communication with common nitrogen purge/air vent collection manifold 428. Nitrogen supply sub-system 430 is in flow communication with manifold 428 via manual blocking valve 432. False start drain tank 354 is in flow communication with manifold 428 via vent header 434, manual block valve 436 and check valve 438. Check valve 438 is positioned and biased such that flow from tank 414 to manifold 428 is substantially minimized. Nitrogen sub-system 430 pressure is less than purge air sub-system 350 pressure.

Each of liquid fuel drain valves 418 are in flow communication with each header 338 via each drain header 416. Each of valves 418 are also in flow communication with tank 354.

During predetermined operational activities, for example, subsequent to a shift from combustion turbine liquid fuel mode to gas fuel mode, purge air pressure downstream of check valves 420 and 422 bias check valve 420 closed and check valve 422 open. Liquid fuel manual drain valves 418 may be opened to drain liquid fuel from a portion of system 300 downstream of stop valve 326 via drain headers 316. Upon verification that liquid fuel is sufficiently drained from a portion of system 300, nitrogen supply valve 432 may be opened to nitrogen purge manifold 428. As nitrogen flows into manifold 428 and vent header 434, valve 436 may be opened for a sufficient period of time to remove air from header 434 and manifold 428. When pressure is equalized in manifold 428, nitrogen purge valves 426 may be opened to permit nitrogen to flow into purge headers 424. With check valve 420 biased closed, and fuel header 338 in flow communication with header 424, nitrogen may flow into header 338. Nitrogen pressure tends to bias flow of remaining liquid fuel towards drain headers 416 and out of a portion of system 300 via drain valves 418 to false start drain tank 354. Upon completion of nitrogen purge activities, valves 418 may be closed and nitrogen pressure may be maintained in headers 424 and 338 to facilitate prevention of air infiltration into header 338. In addition, vent valve 404 may be biased towards an open disposition as described above for a predetermined period of time to facilitate air and/or liquid fuel removal from a portion of system 300 between the interconnection point of headers 424 and 338 and the interconnection point between headers 334 and 402 into tank 354 via a bias induced via nitrogen purge activities.

In the alternative embodiment, nitrogen purge/air vent headers 424 have a substantially upward slope with respect to flow divider discharge headers 338. The upward slope facilitates transport of purge air that may leak through fuel check valves 420 during periods when the combustion turbine is operating in gas fuel mode as described above. Collection manifold 428 is positioned to be the high point of a portion of system 300 to facilitate air flow toward collection manifold 428 from check valve 420 via header 424.

Nitrogen purge sub-system 400 also facilitates refilling headers 338 with liquid fuel up to fuel check valves 420 such that the potential for air to remain in headers 338 is substantially minimized. Purge air sub-system 350 pressure is greater than fuel system 300 pressure with pump 306 out of service and valve 318 open, therefore, check valve 420 is biased towards a closed disposition. Once liquid fuel forwarding pump (not shown in FIG. 2) of fuel forwarding sub-system 302 is placed in service, valve 318 is opened and valves 322 and 326 are biased to transmit liquid fuel to header 334, liquid fuel will fill headers 338. Liquid fuel will substantially fill headers 338 via flow divider 336. As liquid fuels enters headers 338, air and nitrogen will be biased towards headers 424 and transmitted to false start drain tank 414 via valves 426, manifold 428, header 434, valve 436 and check valve 438. In addition, vent valve 404 may be biased towards an open disposition as described above for a predetermined period of time to facilitate air and/or nitrogen removal from a portion of system 300 between valve 326 and the interconnection point between headers 334 and 402 into tank 354 via a bias induced via liquid fuel filling activities.

Some known combustion turbine maintenance activities include facilitation of air introduction into various system 300 cavities while the combustion turbine is in a shutdown condition, for example, in header 338 between flow dividers 336 and check valves 420. This air may remain in header 338 through combustion turbine commissioning activities and facilitate formation of air pockets that may facilitate a delay in initiating a substantially steady liquid fuel flow during combustion turbine restart. Sub-system 400 facilitates removal of air from header 338 using the liquid fuel refilling method of system 300 as described above. This method may increase reliability of operating mode transfers from gas fuel to liquid fuel during commissioning.

Sub-system 400 facilitates a potential increase in combustion turbine reliability by permitting liquid fuel to be maintained up to check valve 420 with the potential for air pockets in fuel system 300 mitigated, thereby facilitating gas fuel-to-liquid fuel mode transfers. Liquid fuel maintenance up to check valve 420 is facilitated by a method of filling system 300 with liquid fuel while venting air via sub-system 400. Sub-system 400 further facilitates maintenance of liquid fuel up to check valve 420 via facilitating a method of purge air removal from liquid fuel via upwardly-sloped headers 424. System 300 reliability may also be increased via mitigation of carbonaceous particulate formation, wherein the formation process is described above.

Sub-system 400 may mitigate carbonaceous particulate formation in fuel system 300 via facilitating a method of removing liquid fuel via a fuel drain process and a nitrogen purge process from areas wherein temperatures may exceed 93° C. (200° F.). The nitrogen purge process also facilitates removal of air from a portion of system 300 that substantially reduces the potential for air and fuel interaction.

System 300 may also facilitate reliability via providing a method for liquid fuel removal from at least a portion of system 300 using the aforementioned gravity drain and nitrogen purge processes that facilitate biasing liquid fuel towards false start drain tank 354, wherein these processes also facilitate mitigating the potential for liquid fuel to be received, and subsequently ignited, by combustor cans 346 during gas fuel mode operations.

The methods and apparatus for a nitrogen purge sub-system described herein facilitate operation of a combustion turbine fuel system. More specifically, designing, installing and operating a nitrogen purge sub-system as described above facilitates operation of a combustion turbine fuel system in a plurality of operating modes by minimizing a formation of carbonaceous precipitate particulates due to a chemical interaction between a liquid fuel distillate and air. Furthermore, the useful in-service life expectancy of the fuel system piping and combustion chambers is extended with the nitrogen purge sub-system. As a result, degradation of fuel system efficiency and effectiveness when placed in service, increased maintenance costs and associated system outages may be reduced or eliminated.

Although the methods and apparatus described and/or illustrated herein are described and/or illustrated with respect to methods and apparatus for a combustion turbine fuel system, and more specifically, a nitrogen purge sub-system, practice of the methods described and/or illustrated herein is not limited to nitrogen purge sub-systems nor to combustion turbine fuel systems generally. Rather, the methods described and/or illustrated herein are applicable to designing, installing and operating any system.

Exemplary embodiments of nitrogen purge sub-systems as associated with combustion turbine fuel systems are described above in detail. The methods, apparatus and systems are not limited to the specific embodiments described herein nor to the specific nitrogen purge sub-system designed, installed and operated, but rather, the methods of designing, installing and operating nitrogen purge sub-systems may be utilized independently and separately from other methods, apparatus and systems described herein or to designing, installing and operating components not described herein. For example, other components can also be designed, installed and operated using the methods described herein.

While the invention has been described in terms of various specific embodiments, those skilled in the art will recognize that the invention can be practiced with modification within the spirit and scope of the claims.

What is claimed is:

1. A nitrogen purge sub-system for a liquid fuel system for a dual fuel combustion turbine, the fuel system having at least one cavity, said nitrogen purge sub-system comprising a purge-air subsystem, a source of nitrogen coupled to a pipe in flow communication with the cavity, said nitrogen purge sub-system further comprising at least one three-way valve that controls flow of nitrogen from said source to the cavity via said pipe, said at least one three-way valve having an open condition, wherein nitrogen flows from said source through said pipe and into the cavity to facilitate removal of liquid fuel and air from the cavity such that a formation of a carbonaceous precipitate particulate is mitigated, said nitrogen purge subsystem further comprising a drain valve coupled in flow communication with said at least one three-way valve; and wherein the purge-air subsystem is in flow communication with the three-way valve to facilitate removal of liquid fuel in a combustor.

2. A nitrogen purge sub-system in accordance with claim 1 wherein said at least one three-way valve is coupled to at least one sensing line and to at least one pilot air supply, said at least one three-way valve comprises at least one spring, at least one shuttle spool, and at least one flow port, such that said at least one sensing line, said at least one spring, said at least one pilot air supply, said at least one shuttle spool and said at least one flow port induce a bias, said bias being such that transport of fuel, air and nitrogen within at least a portion of the fuel system is facilitated.

3. A nitrogen purge sub-system in accordance with claim 2 wherein said at least one three-way valve further comprises at least one passage in flow communication with said pipe such that transport of fuel, air and nitrogen within at least a portion of the fuel system is facilitated.

4. A nitrogen purge sub-system in accordance with claim 1 further comprising a plurality of check valves, said plurality of check valves induce a bias, said bias being such that transport of fuel, air and nitrogen within at least a portion of the fuel system is facilitated.

5. A nitrogen purge sub-system in accordance with claim 1 further comprising:
at least one nitrogen purge pipe;
a nitrogen purge manifold wherein said manifold supplies nitrogen to and receives air from at least one fuel pipe via said at least one nitrogen purge pipe; and
at least one pressure relief valve.

6. A nitrogen purge sub-system in accordance with claim 5 wherein said at least one nitrogen purge pipe comprises at least a portion of said nitrogen purge pipe being biased with an upward inclination with respect to a substantially horizontal plane such that air removal from at least a portion of the fuel system and transporting air to said nitrogen purge manifold is facilitated.

7. A nitrogen purge sub-system in accordance with claim 5 wherein said at least one nitrogen purge pipe comprises at least one passage in flow communication with said three-way valve such that removal of fuel from at least a portion of the fuel system is facilitated via transfer of fuel from at least a portion of the fuel system to the cavity using a motive force induced via gravity.

8. A nitrogen purge sub-system in accordance with claim 5 wherein said at least one nitrogen purge pipe further comprises at least one passage in flow communication with said three-way valve and said nitrogen source, such that removal of fuel from at least a portion of the fuel system is facilitated via inducing a motive force to bias fuel within at least a portion of the fuel system towards the cavity, the cavity comprises a first pressure, said nitrogen source comprises a second pressure, said second pressure being greater than said first pressure, and furthermore, such that removal of air from at least a portion of the fuel system is facilitated via inducing a motive force to bias air within at least a portion of the fuel system towards the cavity, the cavity comprises a third pressure, wherein air within at least a portion of the fuel system comprises a fourth pressure and said nitrogen source comprises a fifth pressure, said fifth pressure being greater than said fourth pressure, and said fourth pressure being greater than said third pressure.

9. A nitrogen purge sub-system in accordance with claim 5 wherein said at least one pressure relief valve comprises a normally closed bias and an open bias to facilitate air removal from at least a portion of the fuel system.

10. A liquid fuel system in a turbine combustor comprising a purge-air subsystem, a nitrogen purge sub-system comprising at least one valve, at least one pipe, at least one cavity, and at least one pump, said nitrogen purge sub-system further comprising a source of nitrogen coupled to said pipe in flow communication with said cavity, said nitrogen purge sub-system further comprising at least one three-way valve that controls a flow of nitrogen from said source to said cavity via said pipe, said at least one three-way valve having an open condition, wherein nitrogen flows from said source through said pipe and into said cavity to facilitate removal of liquid fuel and air from said cavity such that a formation of a carbonaceous precipitate particulate is mitigated, said nitrogen purge subsystem further comprising a drain valve coupled in flow communication with said at least one three-way valve; and wherein the purge-air subsystem is in flow communication with the three-way valve to facilitate removal of liquid fuel in the combustor.

11. A liquid fuel system in accordance with claim 10 wherein said purge air sub-system at a first pressure facilitates a fuel flow from at least a portion of said at least one pipe at a second pressure, wherein said first pressure is greater than said second pressure, said fuel flow biased toward said cavity at a third pressure, wherein said second pressure is greater than said third pressure.

12. A liquid fuel system in accordance with claim 10 wherein said at least one three-way valve is coupled to at least one sensing line and to at least one pilot air supply, said at least one three-way valve comprises at least one spring, at least one shuttle spool, and at least one flow port, such that said at least one sensing line, said at least one spring, said at least one pilot air supply, said at least one shuttle spool and said at least one flow port induce a bias, said bias being such that transport of fuel, air and nitrogen within at least a portion of said liquid fuel system is facilitated.

13. A liquid fuel system in accordance with claim 10 further comprising a plurality of check valves, said plurality of check valves induce a bias, said bias being such that transport of fuel, air and nitrogen within at least a portion of said liquid fuel system is facilitated.

14. A liquid fuel system in accordance with claim 10 further comprising at least one pressure relief valve, said at least one pressure relief valve comprises a normally closed bias and an open bias to facilitate air removal from at least a portion of said liquid fuel system.

* * * * *